United States Patent [19]

Kaneko

[11] Patent Number: 5,701,513
[45] Date of Patent: Dec. 23, 1997

[54] SYSTEM FOR INDEPENDENTLY TRANSFERRING DATA BETWEEN A PLURALITY OF DISK DRIVES AND PLURALITY OF HOSTS IN THE ORDER OF DRIVES COMPLETING DISK PREPARATION OPERATIONS

[75] Inventor: Hiroyuki Kaneko, Tokyo, Japan

[73] Assignee: Kabushiki Kaisha Toshiba, Kawasaki, Japan

[21] Appl. No.: 158,355

[22] Filed: Nov. 29, 1993

Related U.S. Application Data

[63] Continuation of Ser. No. 815,049, Dec. 31, 1991, abandoned.

[30] Foreign Application Priority Data

Jan. 8, 1991  [JP]  Japan ............................. 3-0575

[51] Int. Cl.⁶ ........................... G06F 7/00; G06F 13/14
[52] U.S. Cl. ................. 395/826; 395/825; 395/839; 395/840; 395/861; 395/299; 364/243; 364/252.1
[58] Field of Search ....................... 395/275, 825, 395/826, 827, 828, 839, 840, 861, 299; 360/78.04; 364/243, 252.1

[56] References Cited

U.S. PATENT DOCUMENTS

| 4,200,928 | 4/1980 | Allan | 395/425 |
|---|---|---|---|
| 4,320,456 | 3/1982 | Heise et al. | 395/278 |
| 4,413,317 | 11/1983 | Swenson | 395/275 |
| 4,837,680 | 6/1989 | Crockett et al. | 395/325 |
| 4,935,828 | 6/1990 | Frissell | 395/275 |

OTHER PUBLICATIONS

IBM Technical Disclosure Bulletin, vol. 29 No. 5. Oct. 86, "Ehanced Disk Task Sequencing"pp. 1946–1948 Oct. 1996.

*Primary Examiner*—Thomas C. Lee
*Assistant Examiner*—Ki S. Kim
*Attorney, Agent, or Firm*—Oblon, Spivak, McClelland, Maier & Neustadt, P.C.

[57] ABSTRACT

Upon receiving a data transfer command for a first disk drive supplied from a first host apparatus, a disk controller activates the seek operation of the first disk drive. In this state, when a second host apparatus supplies a data transfer command for a second disk drive, the disk controller 22 receives the command and activates the seek operation for the second disk drive. The disk controller 22 first executes data transfer between one of the first and second disk drives in a multi-seek operation state, which has completed the seek operation first, and the host apparatus.

6 Claims, 3 Drawing Sheets

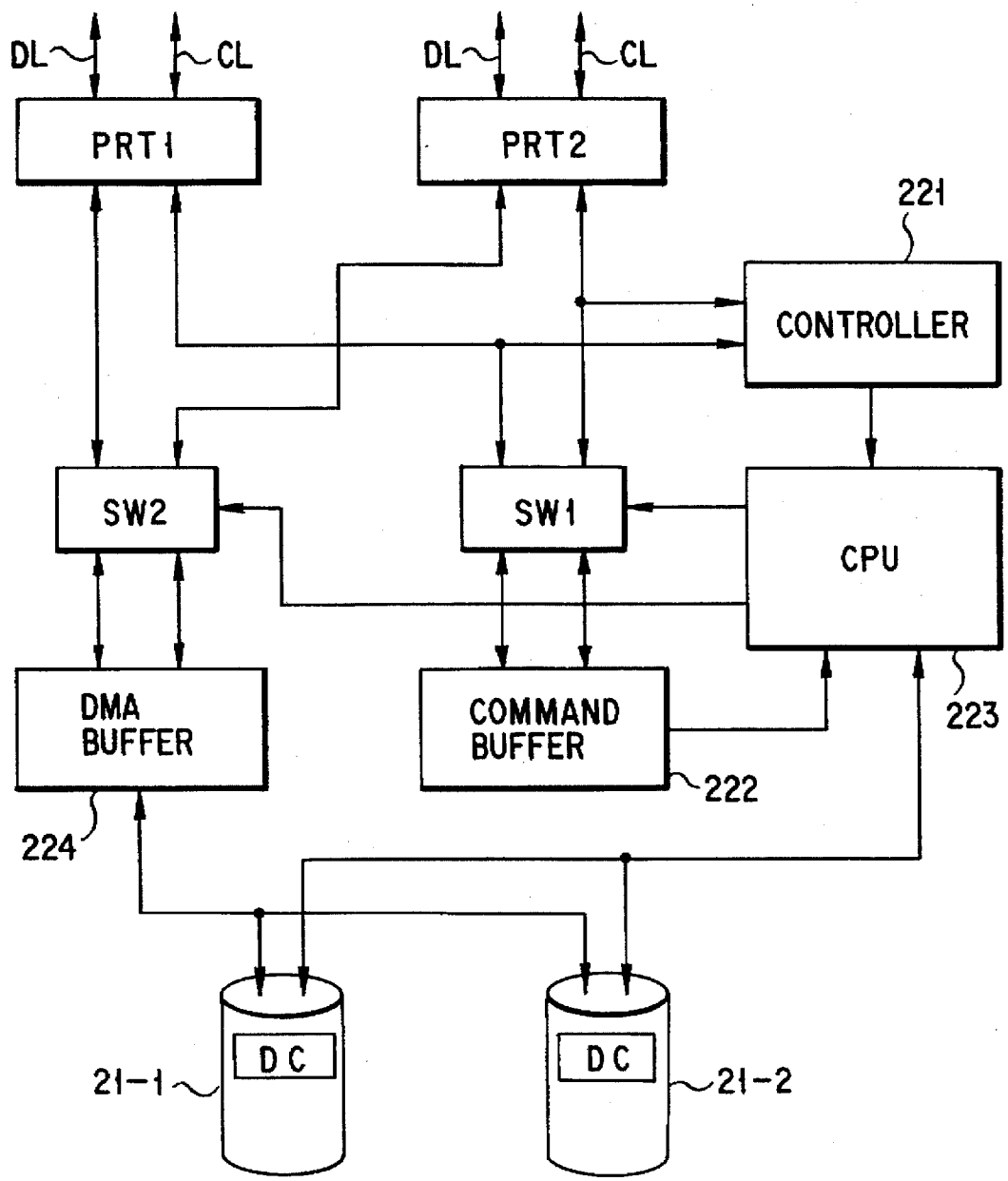
F I G. 3

SYSTEM FOR INDEPENDENTLY TRANSFERRING DATA BETWEEN A PLURALITY OF DISK DRIVES AND PLURALITY OF HOSTS IN THE ORDER OF DRIVES COMPLETING DISK PREPARATION OPERATIONS

This application is a Continuation of application Ser. No. 07/815,049, filed on Dec. 31, 1991, now abandoned.

BACKGROUND OF THE INVENTION

1. Field of the Invention

The present invention relates to a disk control apparatus and a disk control method of controlling a plurality of disk drives for performing data transfer with a plurality of host apparatuses.

2. Description of the Related Art

A known magnetic disk control apparatus includes a plurality of ports and a plurality of magnetic disk drives for performing data transfer with a plurality of host apparatuses, i.e., has so-called multi-port and multi-drive functions. When data transfer requests for a plurality of disk drives are supplied to a plurality of ports of a magnetic disk control apparatus of this type, a port which receives the request first is set in a reserve state, and data transfer between that port and a host apparatus is started first. Therefore, if, for example, data transfer requests are issued to a plurality of disk drives and the seek operation of a disk drive to which the data transfer request is issued later is completed earlier, data transfer for that disk drive must be delayed until data transfer for a disk drive to which the data transfer request is issued earlier is completed. For this reason, a conventional magnetic disk control apparatus with multi-port and multi-drive functions has a problem of low throughput.

SUMMARY OF THE INVENTION

The present invention has been made in consideration of the above situation and has as its objective to provide a shared disk control apparatus with a high throughput.

It is another objective of the present invention to provide a shared disk control apparatus capable of performing data transfer between a disk drive which completes a seek operation earlier and a host apparatus without waiting until data transfer between a disk drive to which a data transfer request is issued earlier and a host apparatus is completed.

In order to achieve the above objectives of the present invention, a disk control apparatus according to the present invention comprises receiving means for receiving a data transfer activation command from a given host apparatus regardless of the presence/absence of a data transfer activation command currently being executed. A preparing operation activating means activates, in accordance with the data transfer activation command received by the receiving means, a preparing operation of data transfer, such as a seek operation, for the corresponding disk drive regardless of the states of the other disk drives. Data transfer activating means starts, when the preparing operation activating means sequentially activates the preparing operations for a plurality of disk drives, data transfer between a disk drive for which the preparing operation is completed earlier and a host apparatus. Further data transfers designated by data transfer activation commands are performed not in the order of reception of the data transfer activation commands but from the one designated by a data transfer activation command issued to a disk drive for which the preparing operation is completed earlier.

Suppose, in the above arrangement, the receiving means of the shared disk control apparatus receives a data transfer activation command from a given host apparatus. In this case, even when another data transfer activation command is supplied from another host apparatus to another port before the execution of the first command is finished, the receiving means receives that command. In this manner, the receiving means sequentially receives data transfer activation commands supplied from the respective host apparatuses to the respective ports.

In accordance with the data transfer activation commands received in sequence by the receiving means, the preparing operation activating means sequentially activates the preparing operations for the corresponding disk drives. The data transfer activating means monitors the preparing operations of the individual disk drives. Upon detecting a disk drive for which the preparing operation is completed, the data transfer activating means executes a data transfer activation command for that disk drive regardless of the order of reception.

With the above arrangement, a multi-seek function can be effectively used even in a shared disk control apparatus with a multi-port function and a multi-drive arrangement. Therefore, the performance of the entire system can be improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 3 is a block diagram for explaining the arrangement of a disk controller shown in FIG. 1.

DETAILED DESCRIPTION OF THE PREFERRED EMBODIMENT

A computer system according to an embodiment of the present invention will be described below with reference to the accompanying drawings.

Figure 1:
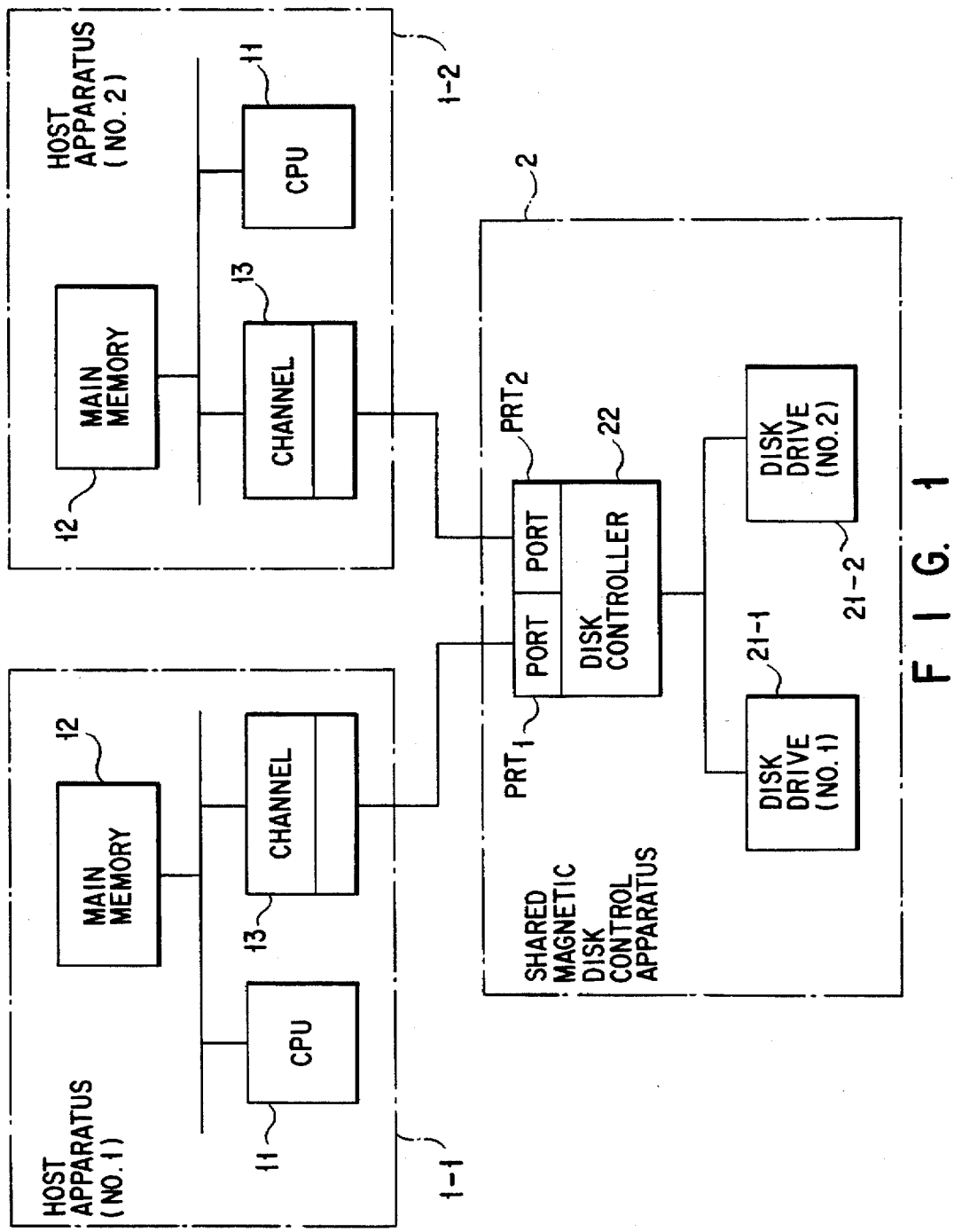
FIG. 1 is a block diagram showing the arrangement of a computer system according to an embodiment of the present invention.

FIG. 1 is a block diagram showing the arrangement of the computer system according to the embodiment of the present invention.

Referring to FIG. 1, reference numerals 1-1 and 1-2 denote two host apparatuses (NO. 1 and NO. 2). Each of the host apparatuses 1-1 and 1-2 has a well-known arrangement including, e.g., a CPU 11, a main memory 12, and a channel 13 for performing data transfer (DMA transfer) between the main memory 12 and a shared magnetic disk control apparatus 2 to be described below.

Reference numeral 2 denotes a shared magnetic disk control apparatus which is shared by the host apparatuses 1-1 and 1-2 and has a multi-port function and a multi-drive function. The shared magnetic disk control apparatus 2 includes, for example, two disk drives 21-1 and 21-2 (NO. 1 and NO. 2) and a disk controller 22 for controlling these disk drives 21-1 and 21-2. The disk controller 22 has a plurality of ports, e.g., two ports PRT1 and PRT2 to be connected to the host apparatuses. The channels 13 of the host apparatuses 1-1 and 1-2 are connected to the ports PRT1 and PRT2, respectively.

Figure 2:
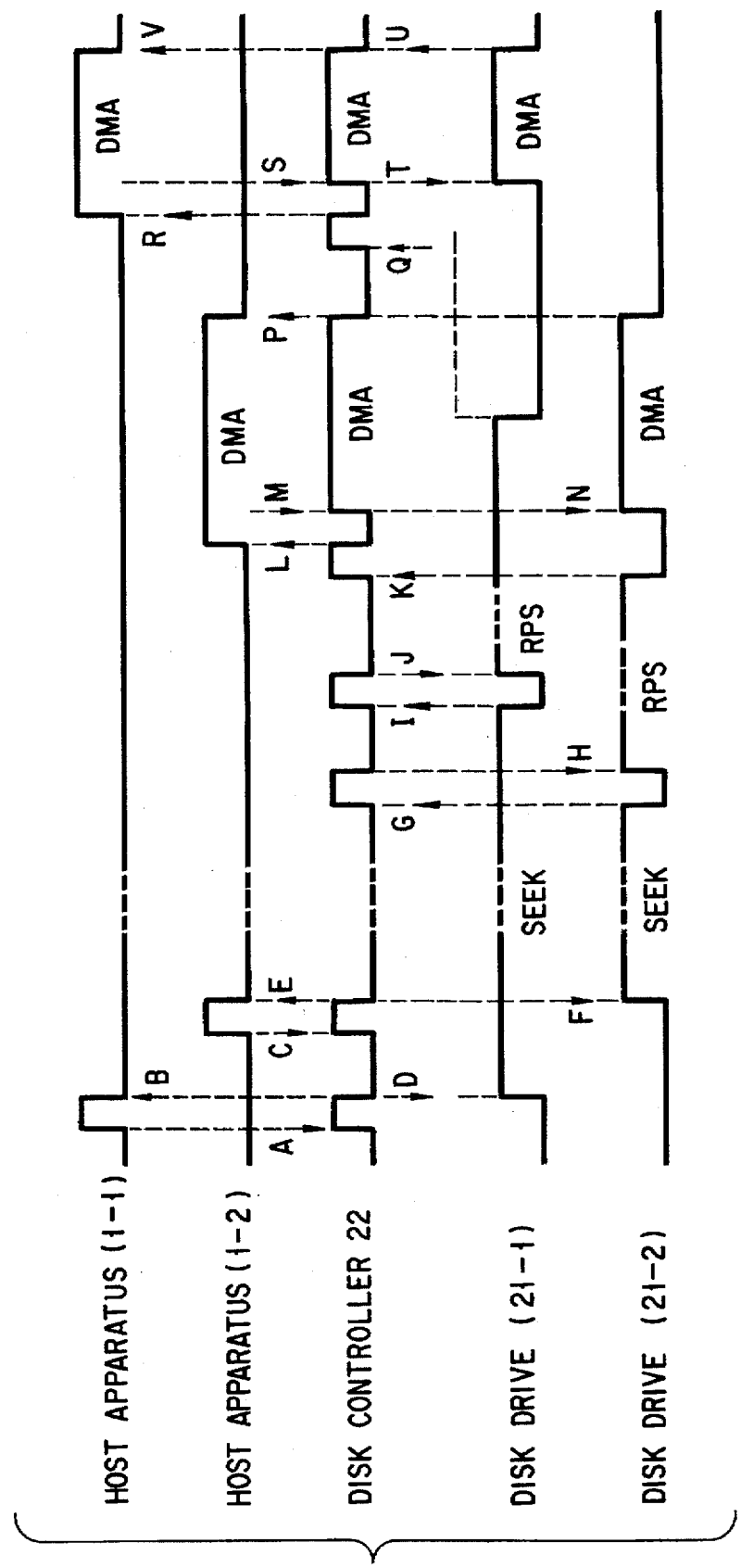
FIG. 2 is a timing chart for explaining the operation of the computer system shown in FIG. 1.

FIG. 2 is a timing chart for explaining the operation of the entire system performed when the host apparatuses 1-1 and 1-2 issue data transfer activation commands to the shared magnetic disk control apparatus 2.

Referring to FIG. 2, reference symbol SEEK denotes the seek operation (an operation of moving a head to a target track) of each of the disk drives 21-1 and 21-2; RPS (rotation-position-sense), a rotational position sensing operation for sensing a target sector; and DMA, data transfer (directory memory access).

In FIG. 2, reference symbols A and C indicate the steps and the timings at which data transfer activation commands from the host apparatuses 1-1 and 1-2 are received; and B and E indicate the steps and timings of the corresponding response processing.

Reference symbols D and F denote the steps and the timings at which the seek operations of the disk drives 21-1 and 21-2 are activated; G and I denote the steps and the timings of the seek operation completion processing of the disk drives 21-1 and 21-2; H and J denote the processing and the timings for executing the rotational position sensing.

Reference symbols K and Q indicate the steps and the timings at which the disk drives 21-1 and 21-2 send rotational position sensing completion information to the disk controller 22; and L and R indicate the steps and the timings at which the disk controller 22 sends data transfer start information to the host apparatuses 1-1 and 1-2.

Reference symbols M and S denote the steps and the timings at which the host apparatuses 1-1 and 1-2 send data transfer start information to the disk controller 22; N and T denote the steps and the timings at which the disk controller 22 sends data transfer start information to the disk drives 21-1 and 21-2; and P and v denote the steps and the timings at which the disk controller 22 sends data transfer completion information to the host apparatuses 1-1 and 1-2.

The operation of the above embodiment will be described below with reference to the timing chart of FIG. 2 by taking a case, in which data transfer activation commands for the disk drives 21-1 and 21-2 are sequentially issued from the host apparatuses 1-1 and 1-2, respectively, to the shared magnetic disk control apparatus 2, as an example. Assume that the seek time of the disk drive 21-2 is shorter than that of the disk drive 21-1.

First, the host apparatus 1-1 issues a data transfer activation command for the disk drive 21-1 to the port PRT1 of the disk controller 22 incorporated in the shared magnetic disk control apparatus 2, which is connected to the host apparatus 1-1. In this case, the disk controller 22 receives the data transfer activation command issued from the host apparatus 1-1 to the port PRT1 regardless of the state of the other port PRT2 (step A).

Upon receiving the data transfer activation command from the host apparatus 1-1, the disk controller 22 sends a reception answer to the host apparatus 1-1 (step B). In addition, since the disk drive 21-1 requested by that command is not busy, the disk controller 22 issues a seek operation command to the disk drive 21-1 (step D). Accordingly, the disk drive 21-1 performs a seek operation (SEEK).

Assume that after the host apparatus 1-1 issues the data transfer activation command for the disk drive 21-1 to the port PRT1 as described above, the host apparatus 1-2 issues a data transfer activation command for the disk drive 21-2 to the port PRT2.

In this embodiment, no port reserve function is introduced. Therefore, when the host apparatus 1-2 issues the data transfer activation command subsequently to the data transfer activation command from the host apparatus 1-1, the disk controller 22 receives this data transfer activation command from the host apparatus 1-2 (step C). The disk controller 22 sends a reception answer to the host apparatus 1-2 (step E) and activates a seek operation for the disk drive 21-2 of interest (step F). Accordingly, the disk drive 21-2 performs the seek operation SEEK.

As a result, the disk drives 21-1 and 21-2 perform in parallel the seek operations corresponding to the data transfer activation commands from the host apparatuses 1-1 and 1-2, respectively. That is, the disk drives 21-1 and 21-2 perform a multi-seek operation.

In this embodiment, suppose that the disk drive 21-2 which starts the seek operation later completes the operation earlier. Upon completion of the seek operation, the disk drive 21-2 sends seek operation completion information indicating the completion to the disk controller 22 (step G).

Upon receiving the seek operation completion information from the disk drive 21-2, the disk controller 22 operates a rotational position sensor mechanism (not shown) incorporated in the disk drive 21-2 in order to sense a target sector (the start sector of a disk region requested by the data transfer activation command from the host apparatus 1-2) (step H). As shown in FIG. 2, the disk drive 21-2 starts the operation RPS for executing the rotation position sensing.

Assume the seek operation of the disk drive 21-1 is completed during the rotation position sensing operation RPS of the disk drive 21-2. In this case, the disk drive 21-1 sends seek operation completion information to the disk controller 22 (step I). Upon receiving the seek operation completion information from the disk drive 21-1, the disk controller 22 operates a rotational position sensor mechanism incorporated in the disk drive 21-1 (step J). Accordingly, the disk drive 21-1 starts the rotational position sensing operation RPS.

Suppose the disk drive 21-2 which started the rotational position sensing operation earlier senses the rotational position (senses that the target sector is close) during the rotational position sensing operation (RPS) of the disk drive 21-1. In this case, the disk drive 21-2 informs the disk controller 22 of the completion of the rotational position sensing (step K).

Upon receiving the rotational position sensing completion information (K) from the disk drive 21-2, the disk controller 22 sends information indicating the start timing of data transfer to the channel 13 of the host apparatus 1-2 through the port PRT2 (step L). Accordingly, the channel 13 of the host apparatus 1-2 starts a data transfer mode if data transfer is possible, and informs the disk controller 22 of this state (step M). Upon receiving the data transfer information (M) from the host apparatus 1-2, the disk controller 22 executes processing for starting data transfer activation for the disk drive 21-2 (step N). As a result, data transfer (DMA) is executed between the host apparatus 1-2 and the disk drive 21-2, as shown in FIG. 2. When this data transfer is completed, the disk controller 22 informs the host apparatus 1-2 of this data transfer completion (step P).

Assume, on the other hand, that the rotational position sensing operation of the disk drive 21-1 is completed during the data transfer (DMA) between the host apparatus 1-2 and the disk drive 21-2. Upon completion of the rotational position sensing operation, the disk drive 21-1 sends information indicating this completion to the disk controller 22 (step Q). In this case, the data transfer is being executed between the host apparatus 1-2 and the disk drive 21-2. Therefore, after this data transfer is completed, the disk controller 22 informs the host apparatus 1-1 of the start timing of data transfer (step R) in accordance with the rotational position sensing completion information (step Q) from the disk drive 21-1. As a result, data transfer (DMA) is executed between the host apparatus 1-1 and the disk drive 21-1.

The internal arrangement of the shared magnetic disk control apparatus 2 will be described below with reference to FIG. 3.

Referring to FIG. 3, the ports PRT1 and PRT2 are connected to the host apparatuses through control lines CL and data lines DL. The control lines CL and the data lines DL are connected to a switch SW1 and a switch SW2, respectively, through the ports PRT1 and PRT2. A controller 221 constantly monitors commands supplied to the ports PRT1 and PRT2. Commands output from the switch SW1 are temporarily stored in a command buffer 222. An output signal from the controller 221 and the contents of the command buffer 222 are supplied to a CPU 223.

The switch SW2 is connected to the data I/O ports of the disk drives 21-1 and 21-2. The CPU 223 is connected to the control ports of the disk drives 21-1 and 21-2.

The operation of the disk controller shown in FIG. 3 will be described below.

The controller 221 constantly monitors commands supplied from the host apparatuses to the ports PRT1 and PRT2 through the control lines CL. Upon detecting a command, the controller 221 informs the CPU 223 of this detection. In response to this information, the CPU 223 connects the switch SW1 to the port to which the command is supplied. As a result, the command is supplied to and stored in the command buffer 222 through the switch SW1. The CPU 223 decodes the command stored in the command buffer 222, detects that the command is a data transfer command, and sends a reception answer to the host apparatus which issued the data transfer command. In addition, the CPU 223 instructs the disk drive 21-1 or 21-2, which is designated by the command, to perform a seek operation. Upon completion of the seek operation, the disk drive 21-1 or 21-2 supplies information indicating the seek operation completion to the CPU 223. In response to the seek operation completion information, the CPU 223 instructs the disk drive 21-1 or 21-2 to perform rotational position sensing.

Each of the disk drives 21-1 and 21-2 incorporates a controller DC. Therefore, the CPU 11 can be released from the control over one disk drive by setting control information in the controller DC of that disk drive and in this manner can execute control over the other disk drive. For this reason, the seek operations and the rotational position sensing operations of the disk drives 21-1 and 21-2 can be executed in parallel.

When the disk drive 21-1 or 21-2 supplies rotational position sensing completion information to the CPU 223, the CPU 223 connects the switch SW2 to the host apparatus 1-1 or 1-2 which had requested access of the disk drive which issued the rotational position sensing completion information, thereby starting data transfer. In other words, regardless of the order of issue of the data transfer activation commands, a disk drive which issued the rotational position sensing completion information earlier is connected to the host apparatus through a DMA buffer 224 and the port PRT1 or PRT2 and starts data transfer. Even when the CPU 223 receives information indicating completion of rotational position sensing from one disk drive during data transfer of the other, the CPU 223 does not change the state of the switch SW2 but continues the data transfer. Upon receiving information indicating that the data transfer is completed from that disk drive, the CPU 223 switches the switch SW2 to start data transfer of the next disk drive.

As has been described above, in this embodiment, the order of data transfers is determined in accordance with not the order of reception of data transfer requests but the order of completion of rotational position sensing operations.

Note that the number of ports of the shared magnetic disk control apparatus 2 is two and the number of disk drives is also two in the above embodiment, but the number of ports or disk drives may be three or more. In addition, the numbers of ports and disk drives need not be the same.

In the above embodiment, data transfer for a disk drive which has completed a rotational position sensing operation first is executed first. However, data transfer for a disk drive which has completed a seek operation first may be executed first. In other words, data transfer for a disk drive which has completed a predetermined data transfer preparing operation first may be executed first so that the operating speed of the entire system is increased.

The above embodiment has been described by taking the case, in which the present invention is applied to a system including the shared magnetic disk control apparatus 2, as an example. The present invention, however, can be applied to a system including another shared disk control apparatus, for example, a shared optical disk control apparatus with a multi-port function and a multi-drive arrangement, to which a plurality of optical disk drives can be connected.

According to the above embodiment as has been described above, the seek operations and the rotational position sensing operations of a plurality of disk drives can be executed in parallel. In addition, data transfer for a disk drive which has completed a data transfer preparing operation first is executed first. As a result, the performance of the entire computer system can be improved.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A disk control apparatus which is connected to a plurality of host apparatuses and which is connected to a plurality of disk drives through bus means, said disk control apparatus controlling data transfer between said host apparatuses and said disk drives, and performing data transfer not in an order of reception of data transfer activation commands but in accordance with an order of a completion signal from a disk drive which has completed a predetermined preparing operation, comprising:

a plurality of ports, each connected to a corresponding host apparatus;

receiving means for receiving a data transfer activation command supplied from one of said host apparatuses to one of said plurality of ports regardless of whether a data transfer activation command which is supplied from another host apparatus to another port is currently being executed;

preparing operation activation means for activating, in accordance with the data transfer activation command received by said receiving means, the predetermined data transfer preparing operation including a seek operation of moving a head of a disk drive to a target track of a disk of the disk drive and a rotational position sensing operation of sensing a target sector of the target track of the disk of the disk drive for a corresponding disk drive; and data transfer activating means, in response to the completion signal from the disk drive which has completed the predetermined preparing operation, for starting the data transfer between the disk drive which has completed the preparing operation and a corresponding one of the host apparatuses through said bus means, the completion signal indicating a termination of both the seek operation and the rotational position sensing operation.

2. An apparatus according to claim 1, wherein said bus includes a data transfer path which is connected to said plurality of disk drives and can transfer data to be written in one of said plurality of disk drives or data read out from said one disk drive, and wherein said preparing operation activating means includes means for connecting, when the data transfer preparing operations of said plurality of disk drives are being executed, said data transfer path to a port connected to a host apparatus which issued a data transfer request for a disk drive which has completed the data transfer preparing operation first, thereby starting data transfer.

3. An apparatus according to claim 1, further comprising means which is connected to said ports to monitor whether commands are supplied to said ports, and when a command is supplied to any of said ports, fetches and decodes the supplied command.

4. An apparatus according to claim 1, wherein when said plurality of disk drives are executing in parallel the data transfer preparing operations, said data transfer activating means starts data transfer between a disk drive which has completed a seek operation first and the corresponding host apparatus.

5. A method of controlling data transfer between a plurality of host apparatuses and a plurality of disk drives, wherein each of said plurality of host apparatuses supplying data transfer activation commands, said method comprising the steps of:

providing a plurality of ports, each connected to a corresponding host apparatus;

receiving a data transfer activation command from one of said plurality of host apparatuses by corresponding one of said plurality of ports regardless of whether data transfer activation commands supplied from other ones of said plurality of host apparatuses is currently being executed by corresponding other ones of said plurality of ports;

activating, in accordance with the data transfer activation command received in said receiving step, a predetermined data transfer preparing operation of a disk drive including a seek operation of moving a head of said disk drive to a target track of a disk of said disk drive and a rotational position sensing operation of sensing a target sector of the target track of the disk of said disk drive; and starting, in response to a completion signal from any one of said plurality of said disk drives, data transfer between the disk drive supplying the completion signal and the corresponding host apparatus, wherein said data transfer between said plurality of host apparatuses and said plurality of disk drives are started in an order of completion signals from said plurality of disk drives, and wherein said completion signal indicates a termination of both the seek operation and the rotational position sensing operation.

6. A computer system including a plurality of host apparatuses and a plurality of disk drives, comprising:

a plurality of host apparatuses;

a plurality of disk drives to be accessed by said host apparatuses;

disk control means, connected to said plurality of host apparatuses and said plurality of disk drives, for performing data transfer between one of said host apparatuses and one of said disk drives; and bus means, connected between said disk control means and said plurality of disk drives, for transmitting data between said disk control means and said plurality of disk drives;

wherein said disk control means includes a plurality of ports connected to said host apparatuses, receiving means for receiving data transfer activation commands supplied from one of said host apparatuses to one of said plurality of ports regardless of whether a data transfer activation command supplied from another host apparatus to another port is currently being executed;

preparing operation activating means, in response to the data transfer activation command received by said receiving means, for causing a corresponding one of the disk drives to perform a data transfer preparing operation regardless of operation states of the other disk drives, said data transfer preparing operation including a seek operation of moving a head of a disk drive to a target track of a disk of the disk drive and a rotational position sensing operation of sensing a target sector of the target track of the disk of the disk drive for the disk drives; and data transfer activating means, in response to a completion signal from a disk drive which has completed the data transfer preparing operation, for starting data transfer for the disk drive in an order of completion signals from the disk drives which have completed the data transfer preparing operation, the completion signal indicating a termination of both the seek operation and the rotational position sensing operation.

* * * * *